United States Patent
McLeod

(10) Patent No.: US 8,261,081 B2
(45) Date of Patent: Sep. 4, 2012

(54) METHOD FOR GOVERNING THE ABILITY OF COMPUTING DEVICES TO COMMUNICATE

(76) Inventor: Steven Charles McLeod, Canberra (AU)

( * ) Notice: Subject to any disclaimer, the term of this patent is extended or adjusted under 35 U.S.C. 154(b) by 318 days.

(21) Appl. No.: 12/704,550

(22) Filed: Feb. 12, 2010

(65) Prior Publication Data

US 2011/0202771 A1    Aug. 18, 2011

(51) Int. Cl.
*H04L 29/06* (2006.01)
(52) U.S. Cl. .................. 713/175; 726/3; 726/6
(58) Field of Classification Search .................. 713/158, 713/175; 726/3, 6
See application file for complete search history.

(56) References Cited

U.S. PATENT DOCUMENTS

| 7,558,955 B2* | 7/2009 | Hooker et al. ................. 713/168 |
| 2008/0130895 A1* | 6/2008 | Jueneman et al. ............. 380/277 |
| 2009/0097661 A1* | 4/2009 | Orsini et al. .................. 380/279 |

* cited by examiner

*Primary Examiner* — Kambiz Zand
*Assistant Examiner* — Ghodrat Jamshidi

(57) ABSTRACT

A method is provided to perform network access control. A computing device utilizing Online Certificate Status Protocol responder functionality determines whether attempted communication should be allowed between other computing devices appropriately configured with Internet Protocol Security (IPsec), digital certificates and OCSP client software. This determination is based on a set of rules considering the role or roles of the computing devices attempting to communicate, and whether the computing devices attempting to communicate have previously exhibited suspicious or undesirable behavior.

2 Claims, No Drawings

METHOD FOR GOVERNING THE ABILITY OF COMPUTING DEVICES TO COMMUNICATE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING APPENDIX SUBMITTED ON COMPACT DISC

Not Applicable

BACKGROUND OF THE INVENTION

The present invention relates to the field of information security, and more particularly to the field of firewalls and network access control.

People increasingly communicate via networked computing devices to conduct business and exchange personal information. This has the undesirable consequence of exposing computing devices and the data they store and process to malicious people. To help reduce this exposure and the associated likelihood and consequences of data compromise, organisations can utilise a computing device known as a network-based firewall in an attempt to control which computing devices are allowed to communicate.

The United States Patent and Trademark Office (USPTO) Class Definition for the firewall subclass provides the following example description of a network-based firewall: "Subject matter including a device installed between internal (private) networks and outside networks (public) and which protects the internal network from network-based attacks that may originate from the outside and to provide a traffic point where security constraints and audits may be affected."

The following paragraphs detail significant undesirable shortcomings with the current state of this firewall technology.

Undesirably, a network-based firewall located on the boundary between an internal network and an outside network typically has no visibility or control of potentially malicious communication between computing devices located on the internal network, since such communication does not traverse the boundary between the internal network and the outside network. Therefore, such a firewall is ineffective at protecting computing devices on the internal network from each other.

Undesirably, there is a significant increase in the use of mobile computing devices which are connected directly to an outside network instead of being connected to an organisation's internal network. Therefore, network-based firewalls located on the boundary between an organisation's internal network and an outside network are becoming less relevant.

Undesirably, the set of rules used by a network-based firewall to determine whether communication between computing devices should be allowed is typically based on the Internet Protocol (IP) address or in some cases the Media Access Control (MAC) address or the name of the computing devices attempting to communicate. It is possible for the IP address, MAC address or name associated with a computing device to easily be changed. Therefore, such a network-based firewall is ineffective at truly understanding which computing devices are attempting to communicate.

Undesirably, malicious people have adapted their techniques enabling them to compromise computing devices using ports and protocols typically allowed by a network-based firewall's rule set. Therefore, such a network-based firewall is becoming less relevant.

The long felt need for alternative network-based protection mechanisms to perform network access control has resulted in existing approaches such as Network Admission Control, Network Access Protection, Intrusion Prevention Systems, domain isolation, host-based firewalls and Virtual LANs (VLANs). These existing approaches focus on complementing network-based firewalls by attempting to address a range of computer security problems that are only somewhat related to the problems identified in the previous paragraphs. Furthermore, existing approaches can introduce additional shortcomings such as the cost of purchasing expensive equipment and recruiting highly skilled specialist staff to implement and maintain complex technologies, lock-in to a specific vendor's approach, limitations on which operating systems can run on the communicating computing devices, as well as a lack of suitability and scalability when applied to networks as large and as distributed as the Internet. There is still a need for alternative network-based protection mechanisms to perform network access control.

Background information unrelated to firewalls but relevant to the present invention is digital certificates and Online Certificate Status Protocol (OCSP), described in "Understanding PKI: Concepts, Standards, and Deployment Considerations" Second Edition authored by Carlisle Adams and Steve Lloyd and published by Addison-Wesley in 2002, which is incorporated by reference. Roughly described, a computing device implementing OCSP responder functionality answers OCSP requests from other computing devices implementing OCSP client functionality that request whether a digital certificate has been revoked. Infrequent cases of digital certificates being revoked by the digital certificate issuer are typically due to the owner of the digital certificate notifying the digital certificate issuer that private information associated with the digital certificate has been lost, stolen or otherwise compromised.

BRIEF SUMMARY OF THE INVENTION

The present invention, roughly described, utilises a computing device performing network access control, utilising OCSP in a manner that is novel, nonobvious, unconventional and deviating from what OCSP was designed for, to achieve an effect somewhat like a firewall by applying a set of rules governing the ability of other appropriately configured computing devices to communicate with each other. To improve the clarity of this specification, the computing device utilising OCSP responder functionality to perform network access control will henceforth be referred to as the "cloudfirewall" to differentiate it from the computing devices whose communications are to be governed by the cloudfirewall. The specific and substantial utility of the present invention is to help protect computing devices from communicating with other computing devices that are considered to be untrustworthy, malicious, compromised or otherwise potentially harmful.

The present invention addresses problems with the current state of technology and has numerous advantages resulting from the present invention departing from the typical approach used by existing network-based firewalls.

The present invention does not require the cloudfirewall to be located inline in between communicating computing devices, and therefore the cloudfirewall can have visibility and control of attempted communication between all appropriately configured networked computing devices.

Furthermore, the present invention does not require the cloudfirewall to be located on the internal network of organisations, but rather can be located in the network "cloud" which means anywhere that is network-accessible by the computing devices whose communications are to be governed. Therefore, the cloudfirewall can be located on an outside network such as the Internet and used to govern the communication between appropriately configured mobile computing devices or home user computing devices that are connected directly to an outside network such as the Internet. A home user computing device appropriately configured to use the present invention has a reduced likelihood of spreading computer worms, participating in distributed denial of service attacks, or otherwise becoming compromised without being detected.

Further contrary to the operation of typical existing network-based firewalls, the set of rules used by the present invention to determine whether communication between computing devices should be allowed does not need to rely on the easily changed IP address, MAC address or domain name of the computing devices attempting to communicate. Furthermore, the set of rules does not need to use the increasingly ineffective approach of considering the port or protocol associated with the attempted communication between computing devices.

There are many other advantages of the present invention. The cloudfirewall functionality can run on inexpensive commodity computer hardware. Also, the present invention does not unnecessarily limit which operating systems can run on the computing devices whose communications are to be governed, and any modern operating system featuring adequate implementations of Internet Protocol Security (IPsec), digital certificates and OCSP client software should be supported. Also, the present invention was tested on an IPv4 wired network, though IPv6 and wireless networks should also be supported. Also, the privacy of computing device owners is considered, since the digital certificates do not need to store the name of their owner, and the cloudfirewall does not have visibility of the actual data content exchanged between other communicating computing devices once they have been authorised to communicate by the cloudfirewall. Finally, the present invention is suitable for both typical organisational internal networks, and networks as large and as distributed as the Internet.

BRIEF DESCRIPTION OF THE SEVERAL VIEWS OF THE DRAWING

Not Applicable

DETAILED DESCRIPTION OF THE INVENTION

A preferred embodiment of the present invention described herein relates to a method for determining whether attempted communication between appropriately configured computing devices should be allowed. A computing device utilising OCSP responder functionality and referred to as a "cloudfirewall" for clarity of this specification is located either locally on an internal network or remotely in the network-accessible "cloud", and determines whether attempted communication between appropriately configured computing devices should be allowed. This determination is based on a set of rules considering the role or roles of the computing devices attempting to communicate, and whether the computing devices attempting to communicate have previously exhibited suspicious or undesirable behaviour.

This preferred embodiment requires the computing devices whose communications are to be governed by the cloudfirewall to be configured with existing IPsec technology using digital certificates for authentication. These digital certificates are configured to store information about the network location of the cloudfirewall which acts as an OCSP responder. A record is made of the role or roles associated with each digital certificate issued, enabling the cloudfirewall to determine the role or roles of each computing device attempting to communicate. Roles in this preferred embodiment are "organisation workstation", "family workstation", "adult workstation", "email server", "web proxy server", "web server without adult material" and "web server with adult material". This preferred embodiment records the role or roles associated with each digital certificate either directly encoded into the digital certificate, or in a database accessible to the cloudfirewall.

In this preferred embodiment, the OCSP client software on the computing devices whose communications are to be governed by the cloudfirewall is configured to "fail closed" and not automatically reissue unanswered OCSP requests, meaning that when a computing device issues an OCSP request to the cloudfirewall regarding the revocation status of a digital certificate, the computing device assumes by default that the digital certificate is revoked unless a timely response stating otherwise is received from the cloudfirewall. This enables the present invention to further depart from the teachings of the OCSP specification, enabling the cloudfirewall to avoid undesirable caching of OCSP responses and conserve processing capacity and network bandwidth, by not responding to OCSP requests if the response would be that the digital certificate questioned in the OCSP request is revoked. Therefore, surprisingly, there are benefits of an OCSP responder disregarding the purpose of its existence by ignoring such OCSP requests and not responding.

When two computing devices configured in this manner attempt to communicate, their IPsec configuration with digital certificates results in them issuing an OCSP request to the cloudfirewall. The computing devices provide the cloudfirewall with details of the other communicant's digital certificate, and request the cloudfirewall to determine whether communication should be allowed, in this preferred embodiment digitally signing the OCSP request to enable enhanced identification of the computing device issuing the OCSP request.

In this preferred embodiment, the cloudfirewall performs the step of determining whether it should bother servicing the computing device issuing the OCSP request, by checking whether the digital certificate of the computing device issuing the OCSP request is revoked, or was issued by an unknown digital certificate issuer or is otherwise invalid. If the result of any of these checks is affirmative, the cloudfirewall either preferably ignores the OCSP request and does not respond, or responds to the computing device issuing the OCSP request with either an error message stating that OCSP requests are unauthorized, or responds that the digital certificate questioned in the OCSP request is revoked and therefore communication should not proceed even though this response might be a lie since the digital certificate questioned in the OCSP request might not actually be revoked.

If the cloudfirewall determined that it should service the computing device issuing the OCSP request, the cloudfirewall performs the existing process of checking whether the digital certificate questioned in the OCSP request is revoked, was issued by an unknown digital certificate issuer, or whether the OCSP request is incorrectly formatted. If the result of any of these checks is affirmative, the cloudfirewall either preferably ignores the OCSP request and does not respond, or responds to the computing device issuing the OCSP request with an answer of "revoked", "unknown" or an error message, indicating that communication should not proceed. Infrequent cases of digital certificates being revoked by the digital certificate issuer are typically due to the owner of the digital certificate notifying the digital certificate issuer that private information associated with the digital certificate has been lost, stolen or otherwise compromised. Though in this preferred embodiment, a digital certificate is also revoked if there is evidence that its associated computing device has sent unsolicited commercial "spam" email or has otherwise exhibited suspicious or undesirable behaviour.

If the cloudfirewall is yet to determine whether the attempted communication should be allowed, the cloudfirewall then performs an important part of the new method of the present invention, using a set of rules to determine whether the attempted communication should be allowed based on the role or roles associated with the digital certificates possessed by the two computing devices attempting to communicate with each other. If the cloudfirewall determined that the attempted communication between the two computing devices should be allowed, the cloudfirewall provides a response of "good" to the computing device issuing the OCSP request. If the cloudfirewall determined that the attempted communication between the two computing devices should not be allowed, the cloudfirewall either preferably ignores the OCSP request and does not respond, or responds to the computing device issuing the OCSP request that the digital certificate questioned in the OCSP request is revoked and therefore communication should not proceed even though this response might be a lie since the digital certificate questioned in the OCSP request might not actually be revoked.

This rules-based determination, which considers the role or roles of computing devices attempting to communicate, utilises OCSP in a manner that is novel, nonobvious, unconventional and deviating from what OCSP was designed for, since instead of the cloudfirewall consistently answering with the true revocation status of a given digital certificate, the answer can dynamically change depending on which computing device is asking. The cloudfirewall "uses and abuses" the OCSP specification and responder functionality, since surprisingly, the present invention requires the cloudfirewall utilising OCSP responder functionality to regularly lie about the true revocation status of digital certificates.

The set of rules is customisable, though a rule in this preferred embodiment is that a computing device possessing a digital certificate indicating the computing device is a family workstation, should be allowed to communicate with a computing device possessing a digital certificate indicating the computing device is a web server without adult material.

Another rule in this preferred embodiment is that a computing device possessing a digital certificate indicating the computing device is an email server, should not be allowed to communicate with a computing device possessing a digital certificate indicating the computing device is a web proxy server.

In this preferred embodiment, if applying the rules resulted in a determination that communication should not be allowed, the cloudfirewall makes a record of the suspicious communication attempt. Once a threshold of suspicious communication attempts is reached and investigated, which in this preferred embodiment is ten suspicious communication attempts in any one hour time period, the digital certificate associated with the computing device that initiated the suspicious communication attempts is revoked so that future communication attempts involving the misbehaving computing device are denied by the cloudfirewall. In this preferred embodiment, the owner of the misbehaving computing device is notified of the suspicious behaviour via an email address or telephone number previously provided to the digital certificate issuer, and the owners of the computing devices recently communicating with the misbehaving computing device are notified of the suspicious behaviour.

A specific embodiment has been described herein to facilitate understanding the present invention. However, the specification is to be regarded in an illustrative rather than a restrictive sense. It is not intended to be exhaustive or to limit the present invention to the precise form disclosed. It will be evident to persons skilled in the art that various modifications and changes may be made without departing from the spirit and scope of the present invention as set forth in the claims. Example modifications are enabling IPsec encryption to enhance data confidentiality, using the digital certificates as additional authentication tokens when users log into web sites, and reducing both time delays and network bandwidth usage by pre-producing responses and/or selectively caching responses from several cloudfirewalls which are sharing the load of handling OCSP requests.

The invention claimed is:

1. A method utilising the known Online Certificate Status Protocol (OCSP) to enable a network-accessible computing device utilising OCSP responder functionality to perform network access control and determine whether attempted communication should be allowed between other computing devices appropriately configured with known Internet Protocol Security (IPsec) with digital certificates and OCSP client software, useful to help protect computing devices from communicating with other computing devices that are considered to be untrustworthy, malicious, compromised or otherwise potentially harmful, with the determination as to whether such communication should be allowed based on a set of rules considering the role or roles of the computing devices attempting to communicate and whether the computing devices attempting to communicate have previously exhibited suspicious or undesirable behaviour, with the method consisting essentially of the following new steps performed by the computing device utilising OCSP responder functionality when it receives an OCSP request from a computing device implementing OCSP client functionality:

determining both the role or roles of the OCSP client computing device issuing the OCSP request, and the role or roles of the computing device possessing the digital certificate questioned in the OCSP request;

determining whether communication should be allowed between the OCSP client computing device that issued the OCSP request and the computing device possessing the digital certificate questioned in the OCSP request, based on whether the role or roles of these two computing devices mean that they have a legitimate reason to communicate, and based on whether either of these two computing devices have previously exhibited suspicious or undesirable behaviour; and, indicating to the OCSP client computing device that issued the OCSP request that communication between these two computing devices should not be allowed, by not sending any response or responding with an error message or an answer of "revoked", or alternatively indicating to the OCSP client computing device that issued the OCSP request that communication between these two computing devices should be allowed by sending a response with an answer of "good".

2. The method of claim 1, consisting essentially of the following additional steps:

logging attempted communication between computing devices;

revoking the digital certificate associated with a computing device that has initiated more than a threshold number of suspicious communication attempts or has otherwise exhibited undesirable behaviour; and, notifying the owner of a computing device behaving suspiciously, as well as notifying owners of computing devices that recently communicated with the misbehaving computing device.

\* \* \* \* \*